J. V. CLARK.
METALLIC PACKING.
APPLICATION FILED DEC. 18, 1911.
1,034,768.
Patented Aug. 6, 1912.
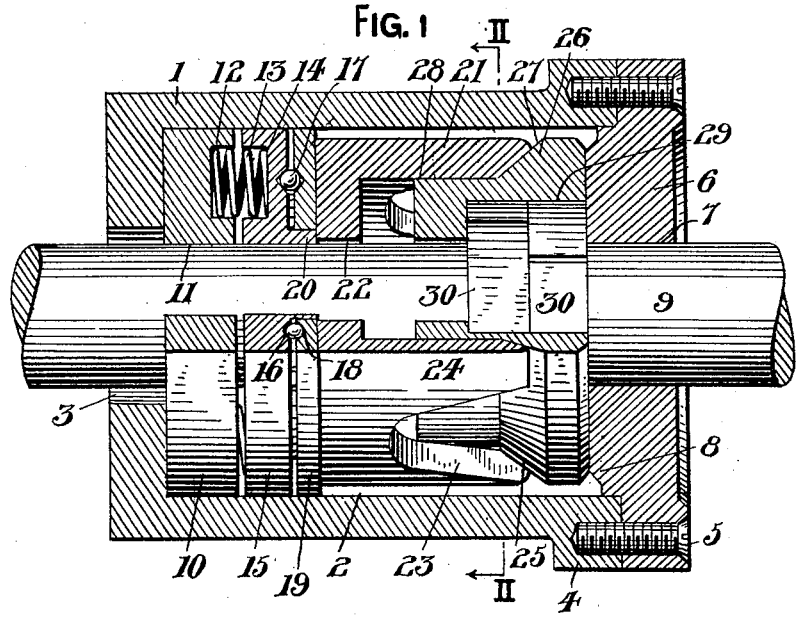
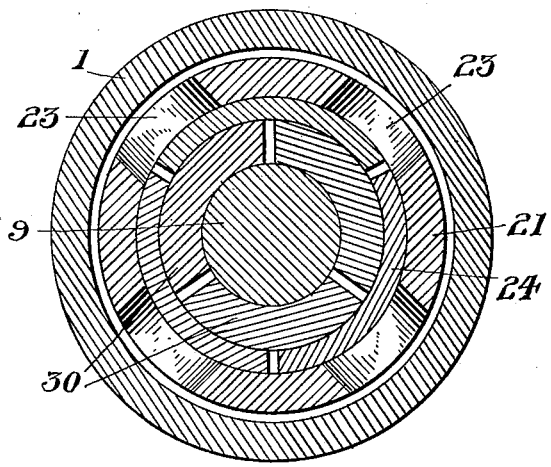
WITNESSES
INVENTOR
Joseph V. Clark
BY
ATTORNEYS

UNITED STATES PATENT OFFICE.

JOSEPH V. CLARK, OF STEUBENVILLE, OHIO, ASSIGNOR TO CARL H. BAXTER, OF EAST LIVERPOOL, OHIO.

METALLIC PACKING.

1,034,768. Specification of Letters Patent. Patented Aug. 6, 1912.

Application filed December 18, 1911. Serial No. 666,415.

*To all whom it may concern:*

Be it known that I, JOSEPH V. CLARK, a citizen of the United States of America, residing at Steubenville, in the county of Jefferson and State of Ohio, have invented certain new and useful Improvements in Metallic Packing, of which the following is a specification, reference being had therein to the accompanying drawing.

This invention relates to packings, and is an improvement of a packing disclosed in my pending application filed April 27, 1911, Serial No. 623,654 and allowed June 22, 1911.

Besides having the same objects in view as disclosed in the pending application referred to above, the present invention aims to provide a packing that can be used in connection with a rock shaft, rotary shaft or reciprocatory piston or sucker rod.

The invention further aims to provide a more efficient packing than that described in my pending application by changing the shape of certain parts of the packing to eliminate certain strains and pressures, thus insuring a more durable structure.

The invention still further aims to accomplish the above results by a combination of mechanical elements that will be hereinafter specifically described and then claimed.

Reference will now be had to the drawing, wherein:—

Figure 1 is a longitudinal sectional view of the packing, partly in elevation, and Fig. 2 is a cross sectional view taken on the line II—II of Fig. 1.

The reference numeral 1 denotes a cylindrical stuffing box, housing or casing having a large cylindrical recess or compartment 2 approximately the same length as the box 1, said recess having one end thereof open and the opposite end thereof in communication with an opening 3 formed centrally at one end of the box. The opposite end of the box has an annular flange 4 and secured to said flange by screws 5 or other fastening means is a cap 6 having a central opening 7 and a portion 8 that extends into the open end of the recess 2. Extending through the opening 7, recess 2 and opening 3 is a movable body 9, as a shaft or rod.

Arranged within the recess 2 and against the end wall thereof is a circular spring holder 10 having an opening 11 providing clearance for the movable body 9. The spring holder has the forward face thereof provided with a plurality of sockets 12 for coiled compression springs 13, said springs extending into sockets 14 provided therefor in the rear face of a bearing member 15. The sockets 13 and 14 are circumferentially arranged and the tension of the springs 13 is sufficient to retain the holder 10 and the member 15 normally separated.

The forward face of the bearing member 15 has an annular ball race 16 for antifriction balls 17 that extend into an annular race 18 provided therefor in a face plate 19 encircling the hub 20 of the member 15. The forward face of the plate 19 engages a cup-shaped adjusting member 21 having the rear end thereof provided with an opening 22 that provides clearance for the movable body 9. The walls of the member 21 are provided with equally spaced slots 23 having inclined walls that provide equally spaced bearing arms 24 and the inner edges of these bearing arms are beveled, as at 25 to provide a seat for a truncated sectional pressure member 26. The sectional member 26 is preferably made in three sections, said sections having beveled walls 27 engaging the beveled edges 25 of the arms 24 and straight walls 28 engaging the inner walls of the cup-shaped adjusting member 21. It is to the shape of this truncated sectional pressure member that I attach considerable importance as said member receives a direct thrust of the adjusting member 21 and the pressure upon the member 26 by the member 21 is equally distributed. The member 26 can be bodily shifted as the pressure upon said member is approximately central thereof and the sections of said member move in unison and uniformly. The longevity of the members 21 and 26 is considerably increased when compared to the members 11 and 14 of my prior invention.

The pressure member 26 encircles the movable body 9 and is provided with an annular recess 29 for a plurality of sectional packing rings 30, each ring consisting preferably of three sections. The rings snugly fit in the recess 29 and are retained therein by the cap 6, which serves as a gland.

Should the body 9 represent a rock shaft, such as commonly used in connection with engines of the "Corliss" type, the body 9 can rock and carry with it the elements 19, 21, 26 and 30, these elements insuring a non-leakable connection between the stuffing box and the body that extends through said box. Should the body 9 represent a reciprocatory piston rod, then all of the elements remain stationary. The arrangement of the elements is such as to compensate for the wear and tear upon the packing.

In using such terms as "rear", "forward", "longitudinal" in connection with certain elements, it is to be understood that these terms are simply used for the convenience of describing the invention.

It will be noted that the above construction may be applied to any well known form of stuffing box.

What I claim is:—

1. A packing comprising a box, a circular spring holder mounted therein and having one face thereof provided with a plurality of sockets, a bearing member opposing said holder and having a plurality of sockets opposing the sockets of said holder, springs mounted in said sockets and separating said bearing member from the holder, said member provided with a hub, a plate mounted upon said hub, anti-frictional balls interposed between said holder and said plate, a cup-shaped adjusting member abutting against said hub and plate and having the wall thereof provided with equally spaced slots having inclined walls forming bearing arms having the inner edges thereof beveled, a pressure member including a cylindrical body terminating in a truncated cone-shaped end against which bears the beveled ends of said arms, said cylindrical body extending into said adjusting member, said pressure member formed of a plurality of sections, and a cap connected to and extending in the box and engaging said pressure member.

2. A packing comprising a box, a cup-shaped adjusting member mounted therein and having its wall provided with equally spaced slots having inclined walls forming bearing arms, said arms having the inner edges thereof beveled, a pressure member including a cylindrical body extending into said adjusting member and further including a truncated cone-shaped portion bearing against the beveled ends of said arms, a resilient abutment for said adjusting member, said abutment positioned in said box, and a cap connected to and extending into the box and opposing the truncated cone-shaped portion of said pressure member.

3. A packing comprising a box, a cup-shaped adjusting member mounted therein and having its wall provided with equally spaced slots having inclined walls forming bearing arms, said arms having the inner edges thereof beveled, a pressure member including a cylindrical body extending into said adjusting member and further including a truncated cone-shaped portion bearing against the beveled ends of said arms, a resilient abutment for said adjusting member, said abutment positioned in said box, a cap connected to and extending into the box and opposing the truncated cone-shaped portion of said pressure member, said pressure member formed of a plurality of sections, and a plurality of packing rings surrounded by said pressure member.

In testimony whereof I affix my signature in the presence of two witnesses.

JOSEPH V. CLARK.

Witnesses:
 MAX H. SROLOVITZ,
 CHRISTINA T. HOOD.

---

Copies of this patent may be obtained for five cents each, by addressing the "Commissioner of Patents, Washington, D. C."